UNITED STATES PATENT OFFICE.

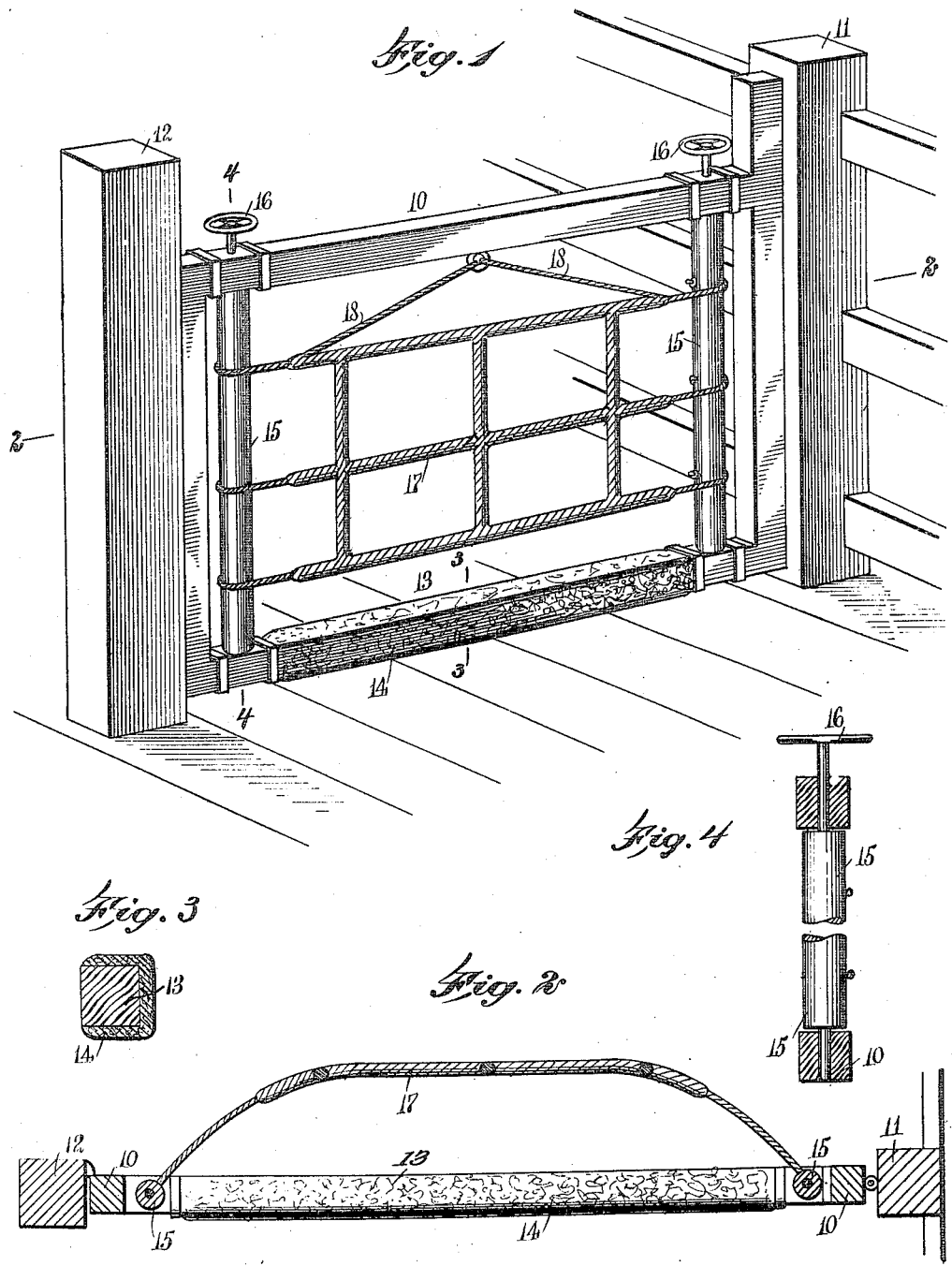

EDWIN COWELL, OF NEW YORK, N. Y.

GATE.

986,269.

Specification of Letters Patent. Patented Mar. 7, 1911.

Application filed August 26, 1910. Serial No. 579,002.

*To all whom it may concern:*

Be it known that I, EDWIN COWELL, a subject of the King of Great Britain, and a resident of the city of New York, borough of Brooklyn, in the county of Kings and State of New York, have invented a new and Improved Gate, of which the following is a full, clear, and exact description.

The invention relates to gates, and has for an object to provide a gate for stopping runaways on bridges, roadways and the like, without injuring the runaway in the act of stopping the same.

For the purpose mentioned, use is made of a frame, preferably adapted to swing on a post and having an extensible baffle mounted thereon, adjusting rollers being connected with the baffle to normally adjust the same after the baffle has been extended, and the lower side of the frame being preferably padded to ease the force of impact of the runaway against the gate.

In most gates for stopping runaways the runaway is seriously injured by striking the gate and the sudden stopping of the runaway often times results in fatal injury. With my gate the runaway is not abruptly brought to a stop, but is gradually stopped by means of the baffle, which when engaged by the runaway unwinds from the rollers. After the baffle has been extended it can be immediately returned to normal position by operating the rollers to rewind the baffle on the rollers.

Reference is to be had to the accompanying drawings constituting a part of this specification, in which similar characters of reference denote corresponding parts in all the views, and in which—

Figure 1 is a perspective view of my device in normal or operative position; Fig. 2 is a sectional view taken on the line 2—2 of Fig. 1 and showing the baffle extended; Fig. 3 is a sectional view taken on the line 3—3 of Fig. 1; and Fig. 4 is a fragmentary sectional view taken on the line 4—4 of Fig. 1.

Referring more particularly to the drawings, I provide a frame 10 hingedly mounted on a post 11 and adapted to abut against a post 12. The lower side 13 of the frame is preferably padded with a suitable padding material 14. Revolubly mounted on the frame 10 are similar adjusting rollers 15 provided at their top ends with handles 16. Interposed intermediate the rollers 15 and secured thereto is a perferably web shaped baffle 17 having a flexible connection 18 between the baffle and the top of the frame to hold the baffle approximately central in the frame 10.

By operating the rollers 15 to wind the ends of the baffle on the rollers, a tension is provided in the baffle and the same is then in the normal position indicated in Fig. 1. When a runaway strikes the baffle the force of the impact unwinds the baffle from the rollers and the baffle takes an extended position, thus gradually breaking the speed of the runaway and greatly decreasing the shock. When used on a bridge or roadway the gate can be swung to one side and out of the line of traffic. When a runaway is sighted, however, the gate can be quickly swung into closed position to constitute a barrier in the roadway and the runaway can be easily stopped.

Although for the purpose of describing my device I have shown a particular construction, it will be understood that the scope of the invention is defined in the appended claims.

Having thus described my invention, I claim as new and desire to secure by Letters Patent:—

1. A gate comprising a frame mounted on a post; a plurality of rollers revolubly mounted on the frame; and an extensible baffle secured to the rollers and mounted therebetween.

2. A gate comprising vertical and horizontal members constituting a frame; rollers revolubly mounted on the horizontal members; an extensible baffle secured to the said rollers; and a connection between the baffle and one of the said horizontal members.

In testimony whereby I have signed my name to this specification in the presence of two subscribing witnesses.

EDWIN COWELL.

Witnesses:
F. A. HOSTER,
PHILIP D. ROLLHAUS.